United States Patent [19]

Watanabe

[11] Patent Number: 4,738,454
[45] Date of Patent: Apr. 19, 1988

[54] AIR SUSPENSION WITH REMOTE AIR INLET AND INLET DUCT PURGE SYSTEM

[75] Inventor: Shunso F. Watanabe, Livonia, Mich.

[73] Assignee: Ford Motor Company, Dearborn, Mich.

[21] Appl. No.: 5,068

[22] Filed: Jan. 20, 1987

[51] Int. Cl.⁴ .......................... B60S 9/00; B62D 37/00
[52] U.S. Cl. .................................. 280/6 R; 280/711; 280/714; 280/DIG. 1
[58] Field of Search .......... 280/6 R, 711, 714, DIG. 1

[56] References Cited

U.S. PATENT DOCUMENTS

| | | | |
|---|---|---|---|
| 3,519,012 | 10/1968 | Van Patten | 137/102 |
| 3,784,220 | 1/1974 | Wanner | 280/711 |
| 3,850,437 | 11/1974 | Owen | 280/6 R |
| 3,881,743 | 6/1975 | Whelan | 280/711 |
| 4,237,935 | 12/1980 | Delmonte et al. | 137/860 |
| 4,396,202 | 8/1983 | Kami et al. | 280/711 |

*Primary Examiner*—Kenneth R. Rice
*Attorney, Agent, or Firm*—Jerome R. Drouillard; Roger L. May

[57] ABSTRACT

An air spring suspension for a vehicle includes a remote air inlet connected to an inlet duct, and an inlet duct purge system which allow the air compressor of the system to be mounted under the floor of the vehicle in an environmentally hostile location.

11 Claims, 1 Drawing Sheet

AIR SUSPENSION WITH REMOTE AIR INLET AND INLET DUCT PURGE SYSTEM

BACKGROUND OF THE INVENTION

1. Field of the Invention

This invention relates to an air spring suspension for a vehicle in which the air suspension has a remote air inlet and an inlet duct purge system.

2. Disclosure Information

Vehicular suspension systems in which an inflatable air spring is used to support a road wheel and tire assembly operatively connected with the chassis of the vehicle are known in the art. Such systems typically employ an electrically driven air compressor for the purpose of supplying air to the air spring assemblies. In order to achieve the pressures required for proper operation in air springs, the compressor assemblies are often of the piston type. It is well known that piston-type compressors cannot tolerate more than a minimal level of contamination from water, road splash, or other types of contamination. Accordingly, air spring suspension compressors are often mounted within the engine compartment of a motor vehicle so as to provide a favorable environment free from the previously mentioned contaminants. Although mounting of a compressor in such a location has generally provided acceptable suspension system architecture, on certain vehicles it is not possible, or desirable, to mount an air spring suspension compressor within the vehicle's engine compartment. In such cases, the air spring suspension compressor could be mounted under the floor of the vehicle. Mounting the air compressor under the floor of the vehicle could, however, create contamination problems, as previously described. The present invention solves this problem by providing an air inlet for the compressor which is located remotely from the compressor in a location wherein the inlet will not be subjected to environmental contamination. As part of the inlet system described herein, an induction valve is located between an inlet duct leading from the air inlet to the compressor inlet, which induction valve will allow contaminants entrained into the air inlet to be purged from a sump located within the induction valve to thereby resist ingestion of contaminants into the compressor.

The induction valve of the present invention comprises a pair of one-way valves. Other applications for one way valves are disclosed in U.S. Pat. No. 3,519,012, which discloses a flat leaf respiratory valve for use in medical studies, and U.S. Pat. No. 4,237,935, which discloses a hydraulic pressure relief valve and fluid isolator for use with a medical transducer in which a pressure relief port is covered with an O-ring having a circular cross section.

It is an object of the present invention to provide an air spring suspension for a vehicle in which the air inlet for supplying air to the air compressor of the system is located remotely from the compressor.

It is another object of the present invention to provide an air spring suspension for a vehicle with a remotely located air inlet and air duct for supplying air to the air compressor of the air spring suspension system in which the inlet duct is connected to the compressor inlet by means of an induction valve such that the system will purge contaminants collecting in a sump within the induction valve when the air spring is exhausted.

In it an advantage of the present invention that the air compressor comprising a portion of a vehicular air suspension may be mounted under the floor of the vehicle in an otherwise hostile environment.

Other objects and advantages of the present invention will be discussed and disclosed in this specification.

SUMMARY OF THE DISCLOSURE

An air spring suspension for a vehicle having a chassis comprises a suspension comprising one or more inflatable air springs, one or more wheel and tire assemblies operatively connected with the chassis by the suspension, a compressor for supplying air to the inflatable air spring, an air inlet, located remotely from said compressor, for supplying air to the compressor, and an inlet duct connecting the air inlet to the compressor and having a first end connected to the air inlet and a second end connected to an induction valve interposed between the second end of the inlet duct and the compressor. The induction valve comprises a sump for accumulating contaminants entrained into the air inlet duct, an induction port and an induction port control element operatively associated therewith for admitting air from said inlet duct into the compressor, and an exhaust port and an exhaust port control element operatively associated therewith for conducting air exhausted from the air spring through the sump so that any contaminants within the sump will be purged from the induction valve.

The compressor of an air spring suspension according to this invention may be located under a floor area of a vehicle. The air inlet of an air spring suspension according to this invention may be located in an area of said vehicle which is elevated relative to the compressor. An air spring suspension according to this invention preferably further comprises an incoming air dryer interposed between the compressor and said air spring. A purge line connects the dryer to the induction valve. Flow through said purge line is controlled by a valve interposed in the purge line between the induction valve and the air spring.

An air spring suspension according to the present invention preferably further comprises a valve for controlling the flow of air from the compressor to the air spring. An air spring suspension according to the present invention may include a height sensor for determining the ride height of the vehicle and an electronic control module for receiving signals from the height sensor and for operating the compressor and valves for controlling flow into the air spring and flow from the air spring into the induction valve.

The induction and exhaust port control elements of the present invention may comprise elastomeric band elements. The induction port control element is positioned about the circumference of an inner valve body portion of the induction valve so as to sealingly close the induction port when air is flowing from the dryer through the exhaust port. The exhaust port control element is positioned about the circumference of an outer valve body portion of the induction valve so as to sealingly close the exhaust port when air is flowing from the inlet duct into the compressor.

An induction valve for an automotive air compressor according to the present invention comprises a generally tubular inner valve body having an intake port through the tubular wall thereof, an intake port control element positioned about the circumference of said inner valve body so as to control flow through the intake port, a generally tubular outer valve body positioned about the circumference of the inner valve body and separated radially therefrom so as to thereby define an annular flow area for air flowing from the intake port to an outlet of the induction valve, with the outer valve body having an exhaust port through the wall thereof, and an exhaust port control element positioned about the circumference of the outer valve body so as to control flow through the exhaust port. The induction valve further comprises means for connecting the intake port to an air inlet duct.

BRIEF DESCRIPTION OF THE DRAWINGS

FIG. 2 shows the position of the induction and exhaust port control elements when air is flowing from the inlet duct to the compressor inlet.

DESCRIPTION OF THE PREFERRED EMBODIMENT

Figure 1:
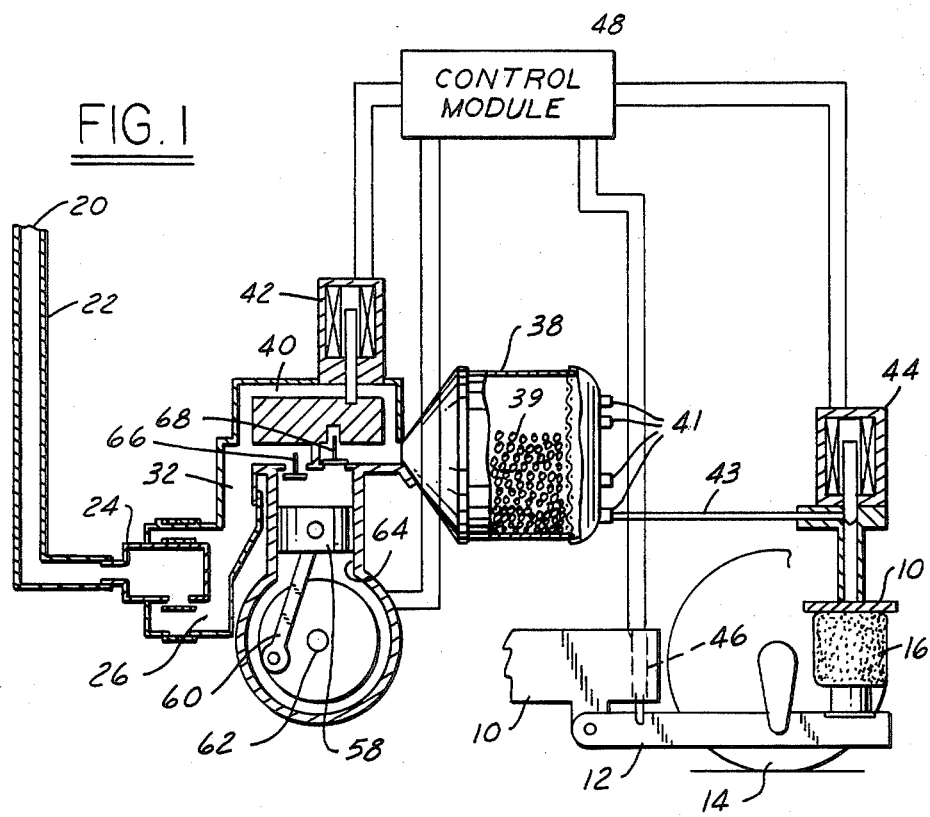
FIG. 1 is a partially schematic representation of an air spring suspension system having a remote air inlet and inlet duct purge system according to the present invention.

As shown in FIG. 1, an air spring suspension for a vehicle having a chassis 10, includes suspension 12. In this case, the suspension comprises a simple beam pivoted to the chassis of the vehicle. Wheel and tire assembly 14 is rotatably mounted upon suspension 12. The suspension includes inflatable air spring 16 which is interposed between the beam portion of suspension 12 and chassis 10. Inflatable air spring 16 thus bears the load of the vehicle. Those skilled in the art will appreciate in view of this disclosure that the suspension illustrated in FIG. 1 is merely exemplary of a class of known suspensions or yet other suspensions, all of which employ inflatable air springs.

Air spring 16 is supplied with air by compressor 18. When the vehicle is loaded, the body of the vehicle (not shown) deflects downward and compresses height sensor 46 which is used to disclose the ride height of the vehicle to control module 48. When control module 48 senses that the vehicle ride height has been reduced to a point wherein the ride height should be increased, control module 48 outputs an appropriate voltage to close purge control solenoid valve 42 and to open air spring control solenoid valve 44. At the same time, compressor 18 will be powered. Air is then supplied to air spring 16 so as to increase the ride height of the vehicle to a desired level.

Air flows through the system of the present invention to air spring 16 as follows: air entering air inlet 20 passes through inlet duct 22 and then through induction valve 24. Upon entering induction valve 24 air is drawn through tube 56 which forms a part of inner valve body 50 and then through induction port 28 which is sealingly closed by induction port control element 30. Air passing through induction port 28 then flows through sump 26 and into compressor inlet 32. Air is admitted into compressor 18 by means of compressor intake valve 66. Inside cylinder 64 of the compressor, piston 58, which is operatively connected to compressor crank shaft 62 by means of connecting rod 60, compresses the air which is then discharged past compressor exhaust valve 68.

Air leaving compressor 18 flows into dryer 38 which is filled with desiccant 39. The desiccant functions to remove moisture from the air leaving the compressor. Air then flows from dryer 38 through a plurality of dryer outlets 41 and then through plurality of air lines 43.

Although only one air line 43 is shown, those skilled in the art will appreciate in view of this disclosure that a plurality of air lines could be employed with one such air line being attached to each of a plurality of inflatable air springs, it being understood that the present disclosure illustrates merely a single exemplary air spring. Air flowing through air line 43 then enters inflatable air spring 16 after flowing past air spring control solenoid valve 44. At such time as height sensor 46 indicates that proper vehicle ride height has been reached, control module 48 will close air spring control solenoid valve 44 and stop compressor 18. In the event that the vehicle is subsequently unloaded, with the result that the ride height increases beyond a desirable level, height sensor 46 will output a signal to control module 48. At this time, the control module will open both air spring control solenoid valve 44 and purge control solenoid 42. Air will then flow from inflatable air spring 16 through air line 43 and dryer 38 and then through purge line 40 past purge control solenoid 42 and then through sump 26 of induction valve 24 and ultimately out through exhaust port 34 which has been opened by exhaust port control element 36. In this manner, any contaminants which may have become entrained in air inlet 20 and inlet duct 22 and which have become accumulated within sump 26 will be purged from the system by dry air which has been discharged from inflatable air spring 16. Accordingly, the compressor inlet region and the sump will be maintained in a dry, contaminant-free condition and the compressor will therefor be protected from the ingestion of contaminants.

Figure 2:
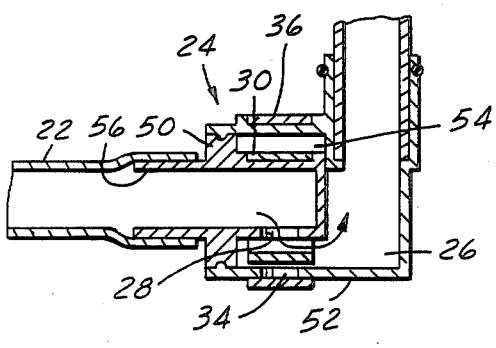
FIG. 2 is an enlarged view of an induction valve shown in FIG. 1.
Figure 3:
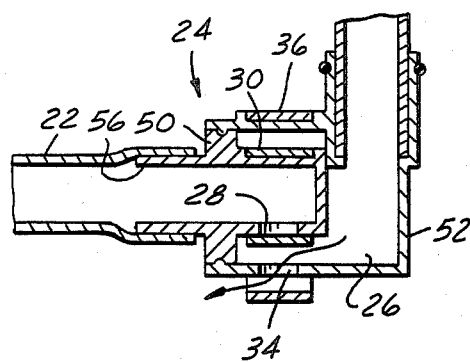
FIG. 3 is similar to FIG. 2 but shows the position of the induction and exhaust port control elements when air is flowing from the air spring and dryer through a purge line and out through the sump of the induction valve.

Details of the construction of the induction valve are shown in FIGS. 2 and 3. As shown in these figures, the valve comprises inner valve body 50 which has generally tubular construction and has induction port 28 through its wall. Inner valve body 50 is connected with inlet duct 22 via tube 56. Induction port control element 30, which comprises a flat elastomer band, is positioned about the outer circumference of inner valve body 50. The position of induction port control element 30 shown in FIG. 2 is the position which the control element takes when the compressor piston is on the intake stroke i.e., when the cylinder of the compressor is being filled with air drawn from the inlet duct. As shown in FIG. 2, during the intake stroke of the compressor exhaust port control element 36 closes exhaust port 34 so that air may be drawn only through air inlet 20, and not through exhaust port 34 and into the compressor.

FIG. 3 shows the operative location of the intake and exhaust port control elements when air is being exhausted from inflatable air spring 16 through sump 26 of the induction valve. As shown in FIG. 3, induction port control element 30 has closed induction port 28 so that any contaminants found within sump 26 will be caused to be discharged through exhaust port 34 past exhaust port control element 36. The induction and exhaust port control elements are preferably comprised of an elastomeric material such as fluorocarbon rubber, nitrile rubber, chloroprene, fluorosilicone rubber, or other types of elastomers. The inner and outer valve bodies are preferably comprised of relatively rigid material, such as certain types of plastic, which may be bonded by solvent welding or other types of processes.

Various modifications and variations will no doubt occur to those skilled in the various arts to which this invention pertains. For example, the particular types of compressor used with the disclosed system or the particular details of the location of the air inlet or other details such as the materials of the induction valve may be altered according to the needs of a particular vehicle. These and all variations which basically rely on the teachings which this disclosure has advanced the art are properly considered within the scope of this invention as defined by the appended claims.

I claim:

1. An air spring suspension for a vehicle having a chassis, comprising:
   a suspension comprising one or more inflatable air springs;
   one or more wheel and tire assemblies operatively connected with said chassis by said suspension;
   a compressor for supplying air to said inflatable air spring;
   an air inlet, located remotely from said compressor, for supplying air to said compressor; and
   an inlet duct connecting said air inlet to said compressor and having a first end connected to said air inlet and a second end connected to an induction valve interposed between said second end of said inlet duct and said compressor, with said induction valve comprising:
   a sump for accumulating contaminants entrained into said air inlet and said inlet duct;
   an induction port and an induction port control element operatively associated therewith for admitting air from said inlet duct into said compressor; and
   an exhaust port and an exhaust port control element operatively associated therewith for conducting air exhausted from said air spring through said sump so that any contaminants within said sump will be purged from said induction valve.

2. An air spring suspension according to claim 1 wherein said compressor is located under a floor area of said vehicle.

3. An air spring suspension according to claim 1 wherein said air inlet is located in an area of said vehicle which is elevated relative to said compressor.

4. An air spring suspension according to claim 1 further comprising an incoming air dryer interposed between said compressor and said air spring.

5. An air spring suspension according to claim 1 further comprising a purge line for connecting said dryer to said induction valve.

6. An air spring suspension according to claim 1 further comprising a valve for controlling the flow of exhausted air flowing from said air spring into said induction valve.

7. An air spring suspension according to claim 1 further comprising a valve for controlling the flow of air from said compressor to said air spring.

8. An air spring suspension according to claim 1 further comprising a height sensor for determining the ride height of said vehicle.

9. An air spring suspension according to claim 1 wherein said exhaust port control element is positioned about the circumference of an outer valve body portion of said induction valve, so as to sealingly close said exhaust port when air is flowing from said inlet duct into said compressor.

10. An air spring suspension according to claim 1 wherein said induction and exhaust port control elements comprise elastomeric band elements.

11. An air spring suspension according to claim 1 wherein said induction port control element is positioned about the circumference of an inner valve body portion of said induction valve, so as to sealingly close said induction port when air is flowing from said dryer through said exhaust port.

* * * * *